United States Patent [19]
Hatta

[11] Patent Number: 4,948,081
[45] Date of Patent: Aug. 14, 1990

[54] HEIGHT ADJUSTING DEVICE FOR AUTOMOTIVE SEAT

[75] Inventor: Susumu Hatta, Akishima, Japan

[73] Assignee: Tachi-S Company, Ltd., Tokyo, Japan

[21] Appl. No.: 388,881

[22] Filed: Aug. 3, 1989

[51] Int. Cl.$^5$ .............................................. E04G 3/00
[52] U.S. Cl. .................................. 248/396; 248/394; 248/421; 248/422
[58] Field of Search ............... 248/393, 394, 395, 396, 248/398, 419, 420, 421, 422; 297/347, 348, 339

[56] References Cited

U.S. PATENT DOCUMENTS

| | | | |
|---|---|---|---|
| 4,073,459 | 2/1978 | Pickles | 248/394 |
| 4,331,313 | 5/1982 | Pickles | 248/397 |
| 4,387,874 | 6/1983 | Boisset | 297/339 X |
| 4,530,481 | 7/1985 | Kluting | 248/424 |
| 4,643,383 | 2/1987 | Fukuta | 248/396 |
| 4,720,070 | 1/1988 | Nishino | 248/421 X |
| 4,787,594 | 11/1988 | Ikegaya | 248/396 X |

FOREIGN PATENT DOCUMENTS 200040 9/1986 Japan .

Primary Examiner—J. Franklin Foss
Attorney, Agent, or Firm—Browdy and Neimark

[57] ABSTRACT

A height adjusting device for an automotive seat comprising a forward seat height adjusting mechanism adapted for height adjustment of the forward part of a seat cushion, a rearward seat height adjusting mechanism adapted for height adjustment of the rearward part of the seat cushion, a control mechanism which is operatively connected with those two height adjusting mechanism, and a pair of first and second sprocket wheels with an endless chain wound thereabout are arranged between the rearward height adjusting mechanism and control mechanism. Thus, a rattling or wobbling is avoided in the rearward height adjusting mechanism.

6 Claims, 3 Drawing Sheets

HEIGHT ADJUSTING DEVICE FOR AUTOMOTIVE SEAT

BACKGROUND OF THE INVENTION

1. Field of the Invention

The present invention relates to a height adjusting device for an automotive seat, and in particular relates to an improvement of such type of height adjusting device wherein the forward and rearward parts of seat back of the seat are adjustable in height independently of each other.

2. Description of prior Art

As typically shown in FIG. 1, an ordinary, hitherto height adjusting device, of this kind, by which the forward and rearward parts of seat back of the seat are adjusted in height, independently of each other, is formed with an upstanding bracket (102) erected upon a slide rail (101), wherein a forward torque shaft (103) and rearward torque shaft (104) are rotatably mounted at the the bracket (102). Although not shown, the slide rail (101) and bracket (102) are each provided as two spaced-apart components, and thus a pair of brackets (102) are respectively mounted on a pair of slide rails (101), with the two torque shafts (103)(104) extended between the brackets. A first sector gear (107) is fixed to the forward torque shaft (104) and meshed with a pinion (109) fixed on an operation spindle (110). To the first sector gear (107), is pivotally connected the lower end of a forward link member (106) which is at its upper end pivotally connected to a frame (not shown) of a seat cushion (118). A first operation handle (112) is fixed on the spindle (110) which is supported through the bracket (102) rotatably. Thus, rotation of the handle (112) causes the vertical movements of the forward part of the seat cushion (118). On the other hand, to the rearward torque shaft (104), is fixed a L-shaped rearward link member (105) whose lower end is connected via a connecting rod (117) with a movable plate (108) mounted rotatably on the bracket (102), the movable plate (108) having a sector gear portion which is meshed with a pinion (113) fixed on an operation spindle (114). The upper end of the rearward link member (105) is pivotally connected to a frame (not shown) of the seat cushion (118). A second operation handle (116) is fixed on the spindle (114) which is rotatably supported through the bracket (102). With this structure, like the first handle (102), rotation of the second one (116) causes the vertical movements of the rearward part of the seat cushion (118). Designations (111)(113) denote a first non-reversible brake device and a second non-reversible brake device, respectively, which are adapted to prevent the reverse rotation of both operation spindles (110)(114), so as to serve to retain a height of both forward and rearward parts of the seat cushion (118). This structure is found commonly from the Japanese Laid-Open Patent Publication No. 61-200040, for example.

However, in the above-constructed prior art height adjusting device, an undesired idle, rattling problem exists in the linkage mechanism at the rearward part thereof. Certainly, the forward linkage, namely, the sector gear (107) and forward link member (106), is directly retained by the first non-reversible brake device (111) against rattling or wobbling, but by contrast, the rearward linkage, namely, the rearward link member (103), connecting rod (105), and movable plate (108), is given a play due to the presence of the connecting rod (117) between the rearward link member (103) and movable plate (108), which results in a rattling or wobbling in such linkage. Consequently, the prior art has been with a rattling problem in the rearward part of the seat cushion.

SUMMARY OF THE INVENTION

It is therefore a purpose of the present invention to provide an improved height adjusting device for an automotive seat which eliminates the above-mentioned rattling or wobbling problem associated with its mechanical elements.

In achievement of such purpose, in accordance with the present invention, there are provided a pair of first and second sprocket wheels, with an endless chain wound thereabout, between a forward height adjusting mechanism and rearward height adjusting mechanism. The forward height adjusting mechanism is adapted for height adjustment of the forward part of a seat cushion frame, including a forward torque shaft, a link means connecting the torque shaft with the seat cushion frame, a sector gear fixed on the torque shaft, a pinion gear provided rotatably on one of the two brackets, and a rotation shaft whose one end is fixed to the pinion gear and whose the other end is fixed to a handle of a control mechanism which is provided one of the two brackets, the rotation shaft passing through a non-reversible brake device. The rearward height adjusting mechanism is adapted for height adjustment of the rearward part of the seat cushion frame, and constructed in the same manner as in the forward one, excepting that it is connected with the control mechanism via the first and second sprocket wheels with the endless chain thereabout, and the second sprocket wheel is connected via a rotation shaft and non-reversible brake device with a rearward torque shaft.

Accordingly, with the above structure, in particular, the rearward height adjusting mechanism is given no play between the control mechanism and itself, because of the endless chain extended between the first and second sprocket wheeles, with the non-reversible device interposed between the rearward torque shaft and second sprocket wheel, whereupon there is no rattling or wobbling problem found in the prior art, presenting a comfortable seating touch to an occupant on the seat, and a more robust construction of the device per se.

In one aspect of the invention, a desired degree of force required to actuate the control mechanism may be set by varying the dimension rate of the first sprocket wheel relative to the second one: Smaller is the outer diameter of the first sprocket wheel relative to that of the second one, more reduced is the degree of force for operating the handle of the control mechanism.

DETAILED DESCRIPTION OF PREFERRED EMBODIMENTS OF THE INVENTION

Figure 1:
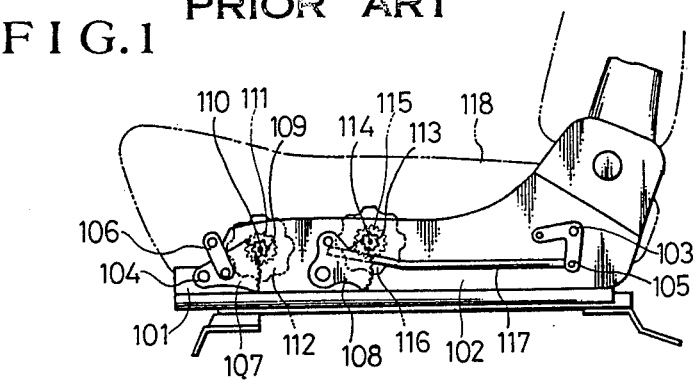
FIG. 1 is a side view of a conventional seat height adjusting device.
Figure 2:
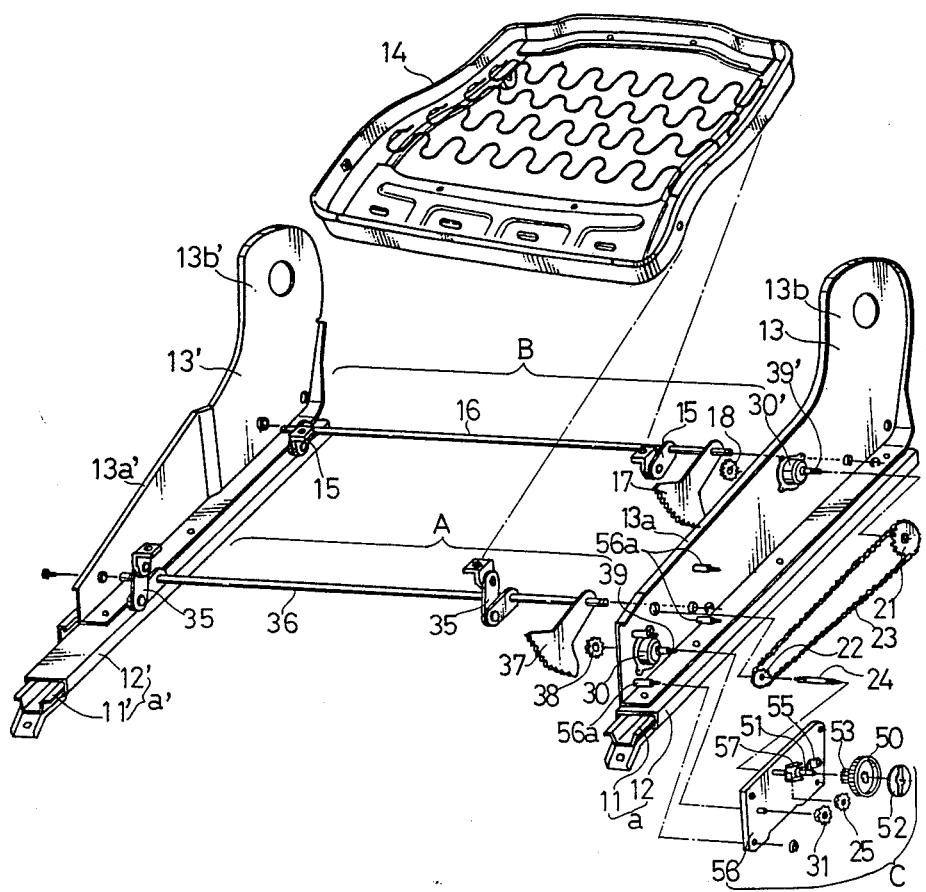
FIG. 2 is an exploded perspective view of a seat height adjusting device in accordance with the present invention.

Referring to FIG. 2, is shown an exploded perspective view of a height adjusting device in accordance with the present invention, wherein a pair of spaced-apart upstanding brackets (13)(13') are respectively mounted upon a pair of slide rails (a)(a') and the two slide rails (a)(a'), respectively, comprise an upper and lower rails (12)(11) and an upper and lower rails (12')(11') such that the lower rails (12)(12') are fixed on the floor of an automobile (not shown) while the upper rails (11)(11') are respectively fitted slidably in the lower rails (12)(12'). Particularly, the two upstanding brackets (13)(13') are fixed upon the respective surfaces of the two upper rails (12)(12'), and are each formed with an upwardly projected part (13b, 3b') at its rearward end part, where a lower bracket of a reclining device (not shown) is mounted, and further formed with an inwardly bent part (13a, 13a') along its upper edge, the inwardly bet parts (13a)(13a') extending therefrom at a right angle.

As illustrated, there are provided a forward height adjusting mechanism (A) and a rearward height adjusting mechanism (B), and an operation mechanism (C), with the arrangement of those three mechanisms being such that the forward height adjusting mechanism (A) is disposed between the tow upstanding brackets (13)(13') at the forward areas of the brackets (13) (13'), the rearward height adjusting mechanism B) is disposed between the same brackets (13)(13') at the rearward areas thereof, and the operation mechanism (C) is disposed laterally of the forward part of the right-side bracket (13) (as viewed from FIG. 2).

The forward height adjusting mechanism (A) comprises a forward torque shaft (36) which is extended between the forward areas respectively of the two brackets (13)(13') such as to be rotatably journalled at its both end portions by the brackets (13)(13') a pair of link members (35)(35) fixed on the forward torque shaft (36) in a mutually spaced-apart relation, with the upper free ends of the link members (35)(35) being pivotally connected to a seat cushion frame (14), a sector gear (37) whose base end is fixed to the right-side end portion of the forward torque shaft (36), a rotation shaft (39) which is a part of a forward non-reversible brake device (30) secured at the outer surface of the forward part of the bracket (13) such that the shaft (39) per se passes through a corresponding hole (not shown) of the bracket (13) and passes also through the brake device (30), with the outward end (39a) of the shaft (39) projected from the outer surface of the bracket (13) and the inward end (39b) thereof projected inwardly of the bracket (13) (see FIG. 5), and a pinion gear (38) fixed on the inward end (39b) of the rotation shaft (39) through a spline connection.

On the other hand, the rearward height adjusting mechanism (B) is constructed in the same way with the foregoing forward one (A), excepting a pair of rearward link members (15)(15). In brief, the construction of the mechanism (B) is such that a rearward torque shaft (16) is rotatably journalled between the two brackets (13)(13'), a sector gear (17) is fixed to the torque shaft (16) on its left side, neighboring the left-side bracket (13), a rearward non-reversible device (30') mounted on the rearward part of the bracket (13), and a pinion gear (18) fixed on the inward end of the rotation shaft (39') associated with the rearward non-reversible device (30').

Figure 3:
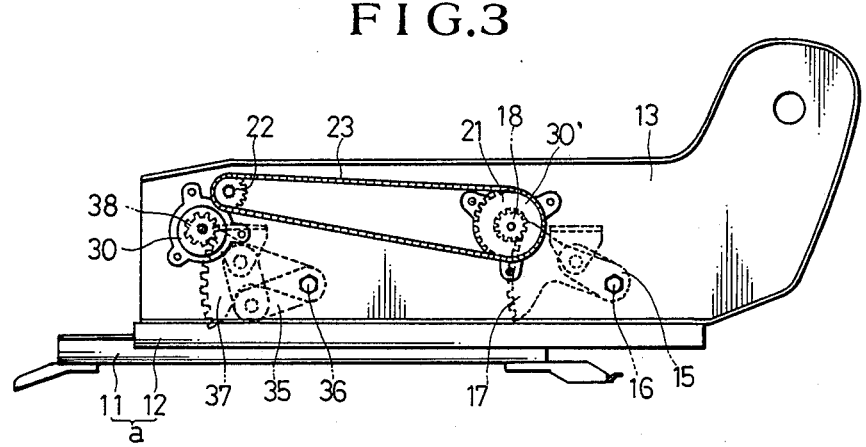
FIG. 3 is a side view of the same device as in FIG. 2, showing a state wherein a control mechanism is deleted.
Figure 4:
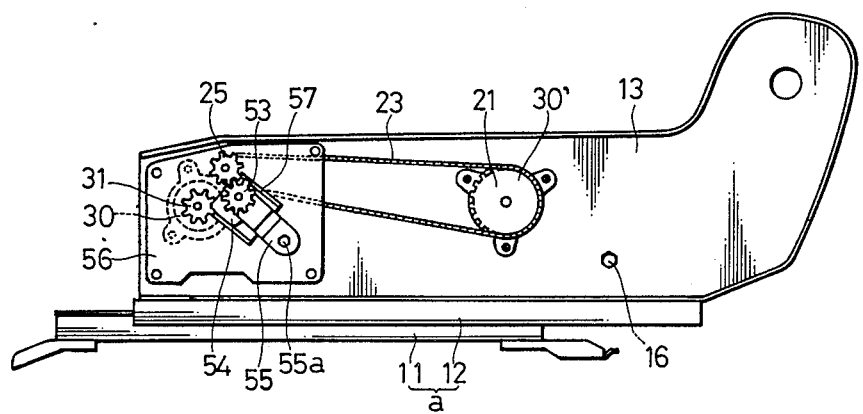
FIG. 4 is a side view, showing a state equipped with the control mechanism.

Laterally of the left-side bracket (13), there are arranged a pair of first small sprocket wheel (22) and second large sprocket wheel (21), with an endless chain (23) being engaged at its front loop-link corner with the first sprocket wheel (22) and at its rear loop-like corner with the second sprocket wheel (21), thus extending between the two sprocket wheels (22)(21) in the longitudinal direction of the bracket (13), as best seen in FIG. 3. The second sprocket wheel (21) is fixed to the outward end of the rotation shaft (39') in a spline connecting manner. The first sprocket wheel (22) is spline connected to a drive shaft (24) which will be described later.

Figure 6:
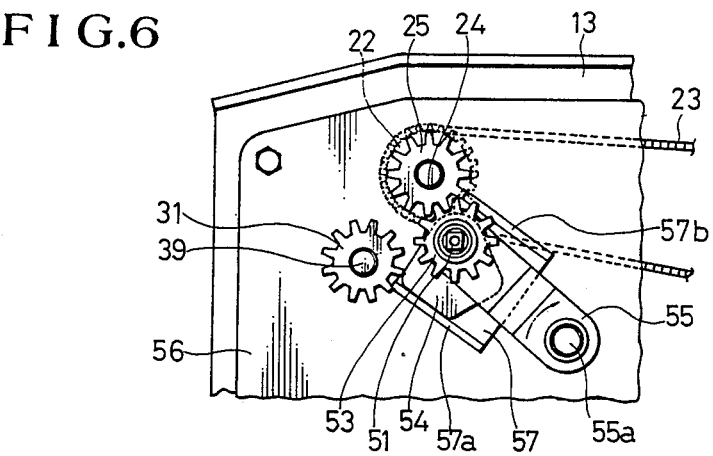
FIGS. 6 and 7 are partially broken side views of the control mechanism.
Figure 7:
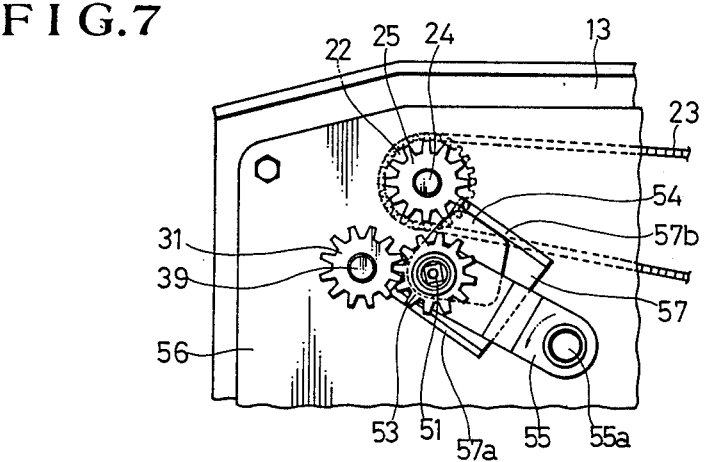
Figure 8:
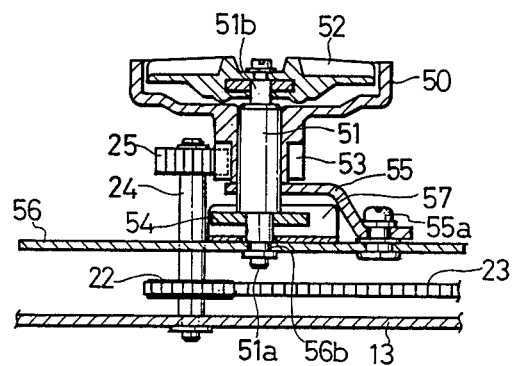
FIG. 8 is a partially broken sectional view of a handle of the control mechanism.

Referring now to FIGS. 4 through 8, a control mechanism (C) is provided at the forward area of the bracket (13). Specifically, a mounting plate (56) is fixed at the forward area of the bracket (13) via four support members (56a), giving a space between the plate (56) and the outer surface of the bracket (13). As can be seen, in such space, are disposed the forward non-reversible brake device (30) and the first sprocket (23) with the chain (23) thereabout. The outward end part (39a) of the rotation shaft (39) passes through the mounting plate (56) rotatably and projects outwardly thereof. The drive shaft (24) is extended rotatably between the bracket (13) and mounting plate (56) such that one end of the drive shaft (24) is rotatably supported on the bracket (13) while the other end thereof passes rotatably through the mounting plate (56), terminating in a rear height adjustment gear (25). As best shown in FIG. 8, the first sprocket wheel (22) is fixed on the drive shaft (24) in a manner being interposed between the bracket (13) and mounting plate (56). On the outward end (39) of the rotation shaft (39), is fixed a forward height adjustment gear (31). Thus, it is seen that the rear height adjustment gear (24) and forward height adjustment gear (31) are disposed upon the outer surface of the mounting plate (56), and that the former (25) is in a coaxial relation with the first sprocket wheel (22) via the drive shaft (24).

As shown in FIGS. 6, 7 and 8, a switch-over lever (55) is pivotally fixed at its base end part on the mounting plate (56) by means of a revet (55a) such that the free end of the lever (55) is free to rotate about the revet (55a) in the arrow directions. At the free end of the lever (55), there passes an operative drive shaft (51) through it rotatably. The shaft (51) is at one extremity end (51a) thereof slidably secured in an arcuate hole (56b) (not clearly shown) formed in the mounting plate (56). With particular reference to FIG. 8, a control handle (5) is provided on the outward end portion of the operative drive shaft (51), whereas a cam (54) having plural discrete cam surfaces is fixed at the inward end portion of the same shaft (51), with the free end of the switch-over lever (55) being interposed between those handle (50) and cam (54). The control handle (50) comprises an integral switch-over gear (53) which is free to rotate about the operative drive shaft (51) and a circular cam operation lever (52) which is integrally fixed to the outward extremity part (51a) of the operative drive shaft (51), whereupon there is established a fixed connection between the cam (54) and the lever (52) through the shaft (51) while on the other hand, the switch-over gear (53) is rotatable about the shaft (51). Accordingly, rotation of the control handle body (50) causes simultaneous rotation of the switch-over gear (53), and the rotation of the cam operation lever (52) causes simultaneous rotation of the cam (54). In addition, as stated above, the control handle (50) per se is rotatable vertically about the rotation center (55a).

As understandable in FIG. 6 and 7, the switch-over gear (53) integral with the handle (50) is so disposed as to be meshed with either of the rear height adjustment gear (25) and forward height adjustment gear (31). Designation (57) denotes a cam limitation bracket having a pair of side vertical walls (57a)(57b), in which bracket (57) there is placed the cam (54) such that its particular one of discrete cam surfaces is abutted against one of the two side vertical walls (57a)(57b) of the bracket (57). In this respect, stated another way, by operating the cam operation lever (52), one selected cam surface of the cam (54) is abutted against the lower-side vertical wall (57a) of the bracket (57), as shown in FIG. 6, and under such state, the switch-over lever (57) is positioned adjacent to the rear height adjustment gear (25), thus, the switch-over gear (53) on the lever (57) is in a meshed engagement with that gear (25). But, when the cam (54) is rotated by operating the lever (52) to bring its cam surface to abutment against the opposite side wall (57b) of the bracket (57), then the switch-over lever (55) is caused to rotate towards the forward height adjustment gear (31) with respect to the rotation point (55), thereby causing meshed engagement of the switch-over gear (53) with that gear (31), as in FIG. 7.

Figure 5:
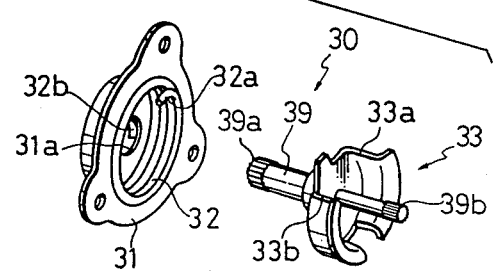
FIG. 5 is an exploded perspective view of a non-reversible bake device.

FIG. 5 shows a common structure of the two non-reversible brake devices (30)(30'). Both devices are one of known ordinary devices of this kind. In brief, in the device (30), for example, a coil spring (32), which has first and second securing parts (32a)(32b), is pressingly accommodated within the inner circular wall of an outer casing (31) and an inner casing (33) is fitted in the outer casing (31), the inner casing (33) having, formed therein, first and second cut-away parts (33a)(33b) so that the first and second securing parts (32a)(32b) are respectively abutted against those first and second cut-away parts (33a)(33b). In the inner casing (33), penetrated and fixed is the above-mentioned rotation shaft (39) and further, the outward end (39a) of the rotation shaft (39) extends through the hole (31a) of the outer casing (33) for spline connection with the forward height adjustment gear (31), with the inward end (39b) of the shaft (39) being spline connected with the pinion gear (38), as stated above.

Now, the operation of the above-described invention will be explained as below.

In order to adjust the height of the front part of a seat cushion (not shown) on the frame (14), the cam operation lever (52) of the control handle (50) is rotated to cause the displacement of the cam (54), bringing its selected cam surface to abutment against the vertical wall (57b) of the cam limitation bracket (57), thereby causing the switch-over lever (55) to rotate about the point (55a) in the arrow direction as in FIG. 7 so as to bring the switch-over gear (53) into meshed engagement with the forward height adjustment gear (39). Then, with the handle (50) being rotated, the switch-over gear (53) integral therewith causes rotation of the adjustment gear (31), which in turn causes rotation of the forward torque shaft (36) through the pinion and sector gears (38)(37), with the result that the two link members (35)(35) are moved vertically to raise or lower the front part of the seat frame (14) with respect to the rear connection point of the frame (14) at (15)(15). In that way, the front part of the seat cushion is adjusted in height as desired by an occupant thereon.

Reversely, in order to adjust the height of the rear part of the seat cushion, a reverse rotation procedure opposed against the foregoing one is effected so as to raise or lower the rearward part of the seat frame (14) with respect to the forward connection point of the frame (14) at (35)(35). Namely, by rotating the cam operation lever (52), the switch-over gear (53) is brought in mesh with the rear height adjustment gear (25) via the cam (57), and then the handle (50) per se is rotated to cause rotation of the first sprocket wheel (22) through the two meshed gears (53)(25), thereby transmitting the rotation force to the second sprocket wheel (21) through the endless chain (23). Accordingly, with the second sprocket wheel (21) rotated thereby, the rearward torque shaft (16) is caused to rotate to move the two link members (15)(15) vertically via the rotation shaft (39') and both pinion and sector gears (18)(17), whereby the rearward part of the seat frame (14) is raised or lowered and, in that manner, the rearward part of the seat cushion is adjusted in height.

In both of the above-described front-and-rear seat-cushion-part height adjustments, it is noted that, after having adjusted the height thereof, the two forward and rearward non-reversible brake devices (30)(30') act to prevent the respective corresponding pinion gears (38)(18) from being rotated reversely so as to retain the respective given heights of the front and rear seat cushion parts, with no influence thereon from an externally applied load or weight.

From the descriptions above, it is appreciated in accordance with the present invention that the rearward height adjusting mechanism (B) is operatively connected with the control mechanism (C) through the combination of the endless chain (23) and two sprocket wheels (22)(21), with the non-reversible brake device (30') interposed between the rearward torque shaft (16) and the second sprocket wheels (21), which constitutes a play-free structure in those movable mechanisms in contrast to the aforementioned prior art and thus presents a tight interlocking system in the height adjustment device, avoiding the rattling or wobbling therein which may create an uncomfortable seating condition of the seat cushion. Further, due to such structure, the device per se is more robust structurally.

Moreover, a desired degree of force required to rotate the handle (50) may be set by varying the dimensional rate of the first sprocket wheel (22) relative to the second one (21): Smaller is the outer diameter of the first sprocket wheel (22) relative to that of the second one (21), more reduced is the degree of force for rotating the handle (50).

What is claimed is:

1. A height adjusting device for an automotive seat having a seat frame of the seat mounted therein so as to be adjustable in height, comprising:
a pair of upstanding brackets erected upon said seat frame;
a forward height adjusting mechanism adapted for height adjustment of a forward part of said seat frame; said forward height adjusting mechanism being provided with a first non-reversible brake device;
a rearward height adjusting mechanism adapted for height adjustment of a rearward part of said seat frame; said rearward height adjusting mechanism being provided with a second non-reversible brake device;

a first sprocket wheel connected with said rearward height adjusting mechanism via said second non-reversible brake device;

a second sprocket wheel rotatably provided in vicinity of said forward height adjusting mechanism;

an endless chain extended between said first and second sprocket wheels;

a first gear provided in a coaxial relation with said second sprocket wheel for simultaneous rotation therewith;

a second gear connected with said forward height adjusting mechanism via said first non-reversible brake device; and a switch-over gear interposed and displaceable between said first and second gears such as to permit selective engagement of said switch-over gear with one of said first and second gears.

2. The height adjusting device according to claim 1, wherein said rearward and forward height adjusting mechanisms includes a first gear and second gear, respectively, and wherein said control mechanism includes a switch-over gear which is movable by means of a handle between said first and second gears so as to be meshed with either of said first and second gears, whereby either of said rearward and forward height adjusting mechanisms is to be actuated through said switch-over gear by operation of said handle.

3. The height adjusting device according to claim 2, wherein said control mechanism further includes a cam by which said switch-over gear is selectively displaced between said first and second gears so as to be brought in a meshed engagement with either of said first and second gears.

4. A height adjusting device according to claim 1, wherein said forward height adjusting mechanism includes a forward torque shaft which is extended rotatably between said forward areas respectively of said two brackets, a sector gear fixed on said forward torque shaft; a pinion gear which is rotatably provided via a non-reversible brake means on one of said two brackets at its rearward area such as to be in a meshed engagement with said sector gear, and a link means operatively connecting said forward torque shaft with said seat cushion frame; and wherein said rearward height adjusting mechanism includes;

a rearward torque shaft which is extended rotatably between said pair of upstanding brackets at their respective rearward areas;

a sector gear fixed on said rearward torque shaft;

a pinion gear which is rotatably provided on one of said brackets at its rearward area such as to be in a meshed engagement with said sector gear; and a link means operatively connecting said rearward torque shaft with said seat cushion frame.

5. The height adjusting device according to claim 4, wherein said control mechanism further includes a rotation shaft which is rotatably supported at said one of said two brackets in a manner passing through said non-reversible brake device, to which rotation shaft is fixed said first sprocket wheel and further a first gear such that both sprocket wheel and first gear are in a coaxial relation, and a switch-over gear provided integrally at said handle, said switch-over gear being meshed engageable with said first gear, whereby operation of said handle of said control mechanism brings said switch-over gear in a mesh with said first gear and causes rotation of said first gear to thereby cause simultaneous rotation of said rotation shaft to rotate both first and second sprocket wheels via said endless chain.

6. The height adjusting device according to claim 5, wherein said control mechanism further includes a cam fixed to one end of said rotation shaft and wherein said cam is adapted to displace said switch-over gear towards and away from said first gear for engagement therewith or disengagement therefrom.

* * * * *